United States Patent Office 3,663,699
Patented May 16, 1972

3,663,699
METHOD OF TRANQUILIZING EMPLOYING N,N'-DIALKOXYMETHYL PHENOBARBITAL
John F. Reinhard and Carlos M. Samour, Wellesley, and Julius A. Vida, Boston, Mass., assignors to The Kendall Company, Walpole, Mass.
No Drawing. Continuation-in-part of application Ser. No. 867,865, Oct. 20, 1969. This application May 19, 1971, Ser. No. 145,053
Int. Cl. A61k 27/00
U.S. Cl. 424—254
2 Claims

ABSTRACT OF THE DISCLOSURE

A series of N,N'-dialkoxymethyl phenobarbitals have been found to be useful as tranquilizers, analgesics and centrally acting skeletal muscle relaxants.

---

This application is a continuation-in-part of copending application Ser. No. 867,865, filed Oct. 20, 1969, now abandoned.

This invention relates to a method of tranquilizing a living animal by the administration of selected N,N'-dialkoxymethyl phenobarbitals. The invention also relates to the use of these compounds as analgesics and as centrally acting skeletal muscle relaxants.

Phenobarbital has long been known to be useful as an anticonvulsant agent in warm-blooded animals, having been employed in the treatment of epilepsy; however phenobarbital has no tranquilizing activity and suffers from the disadvantage that it exhibits hypnotic activity as well as anticonvulsant activity.

Recently a series of N,N'-dialkoxymethyl phenobarbitals was prepared; these compounds are effective anticonvulsant agents and are free from hypnotic activity.

Now it has been found, in accordance with this invention, that the aforementioned N,N'-dialkoxymethyl phenobarbitals are also of therapeutic use as tranquilizers, analgesics and centrally acting skeletal muscle relaxants.

More specifically, the compounds employed in this invention are N,N'-dialkoxymethyl phenobarbitals in which the alkoxy groups contain from 1–12 carbon atoms, such as methoxy, ethoxy, lauryloxy, etc. These compounds and their preparation are fully described in abandoned patent application U.S. Ser. No. 749,972, filed Aug. 5, 1968, which is herewith incorporated by reference in its entirety.

The tranquilizing activity of these compounds renders them effective in treating various psychotic disorders as well as tension and anxiety states. Their efficaciousness for these purposes is particularly attractive in that they induce tranquility without causing sleep or loss of the righting reflex.

In the practice of this invention, the N,N'-dialkoxymethyl phenobarbitals may be formulated with conventional physiologically acceptable vehicles and carriers to make syrups, tablets, and other dosage forms. Effectiveness and toxicity of the compounds are such that each dosage unit may contain from 10 to 500 mg. of active material.

The following example will serve to illustrate the practice of this invention.

EXAMPLE

N,N'-dimethoxymethyl phenobarbital was prepared by reacting sodium phenobarbital with chloromethyl methyl ether as described in abandoned application U.S. Ser. No. 749,972.

Tranquilizer activity was determined according to the procedure described by Cook and Weidley, Ann. N.Y. Acd. Sci. 66: 740 (1957). Initially the rat is subjected to a sound stimulus (buzzer), the conditioned stimulus, followed by an electric shock to the feet, the unconditioned stimulus. The animal jumps to the pole to avoid the shock. After a series of conditioning trials the rat jumps to the pole in response to the buzzer alone. Failure to jump within 30 seconds is the endpoint, and is taken to indicate a tranquilizer response. Administration of N,N'-dimethoxymethyl phenobarbital resulted in the appearance of this endpoint in 50% of the animals ($ED_{50}$) following an oral dosage of about 100 mg./kg. Additional evidence of tranquilizer activity was observed by noting reduced activity in the cages of Rhesus monkeys upon administration of a daily dosage of 75 mg./kg. of N,N'-dimethoxymethyl phenobarbital. Furthermore, a taming effect was observed upon intraperitoneal injection of various doses of N,N'-dimethoxymethyl phenobarbital to adult male rats which had been rendered aggressively hostile as a result of keeping them in solitary confinement for several months.

In addition, skeletal muscle flaccidity without death was observed during the preceding test, indicating activity as a centrally acting skeletal muscle relaxant.

Two established procedures were employed to determine analgesic activity. The method described by Eddy, N. B., and Leimbach, D., J. Pharmacol. Exptl. Therap. 107: 385 (1953) was followed, with the following modifications, in the first procedure. Mice are pretested by placing them individually on the cleaned surface of a copper water bath, the temperature of which is maintained at 54–55° C. The reaction time to this noxious thermal stimulus is the time in seconds required for either licking of the paws or jumping, such that all four paws leave the surface of the plate. The drug is then administered orally, generally at five dosage levels (10 mice per dosage level) and the reaction times are redetermined at intervals of ½ hour, 1 hour, and 2 hours. From the pretreatment reaction times the mean and standard deviations are computed. The cut-off time is taken to be the mean reaction time plus 2 standard deviation units. Reaction times equal to or exceeding this cut-off time are considered to represent analgesic responses. The dosage required to produce an analgesic response in 50% of the animals ($ED_{50}$ and 95% limits) is computed graphically. Following this procedure, an $ED_{50}$ of approximately 200 mg./kg. was determined.

In the second procedure, the method of Siegmund, E., et al. reported in Proc. Soc. Exptl. Biol. and Med. 95: 729 (1957) was generally followed. The method is based on the antagonism by both non-narcotic and narcotic analgesics of a syndrome induced in mice following intraperitoneal injection of phenyl-p-quinone. The syndrome is characterized by intermittent contractions of the abdomen, twisting and turning of the trunk, and extension of the hind legs. The test drug is administered orally or subcutaneously at four to five dosage levels. At the time of peak effect, phenyl-p-quinone is injected intraperitoneally. Inhibition of the syndrome is considered an analgesic response, in spite of the fact that the method is nonspecific. The dosage required for this effect in 50% of the mice ($ED_{50}$) is computed graphically. An $ED_{50}$ of about 50 mg./kg. (subcutaneously) and approximately 100 mg./kg. (orally) was determined.

What is claimed is:

1. A method of tranquilizing a living animal, which comprises administering to an animal free from convulsions N,N'-dialkoxymethyl phenobarbital, wherein each alkoxy group contains 1–12 carbon atoms, in an amount sufficient to produce a tranquilizing effect in said animal.

2. The method of claim 1 wherein N,N'-dimethoxymethyl phenobarbital is employed as the N,N'-dialkoxymethyl phenobarbital.

References Cited

UNITED STATES PATENTS 3,341,512   9/1967   Wegmüller _____ 424—254

STANLEY J. FRIEDMAN, Primary Examiner